United States Patent
Constant, Jr.

(10) Patent No.: US 8,109,440 B2
(45) Date of Patent: Feb. 7, 2012

(54) SYSTEM AND METHOD FOR CALIBRATING AN OPTICAL READER SYSTEM

(75) Inventor: Henry J. Constant, Jr., West Warwick, RI (US)

(73) Assignee: Gtech Corporation, Providence, RI (US)

( * ) Notice: Subject to any disclaimer, the term of this patent is extended or adjusted under 35 U.S.C. 154(b) by 429 days.

(21) Appl. No.: 12/342,522

(22) Filed: Dec. 23, 2008

(65) Prior Publication Data

US 2010/0155474 A1   Jun. 24, 2010

(51) Int. Cl.
*G06K 19/06* (2006.01)
(52) U.S. Cl. ................. 235/438; 235/462.06
(58) Field of Classification Search ............ 235/462.01, 235/462.04, 462.06, 462.14, 454
See application file for complete search history.

(56) References Cited

U.S. PATENT DOCUMENTS

| | | | |
|---|---|---|---|
| 5,912,724 A | 6/1999 | Sakaguchi | |
| 6,788,831 B1 | 9/2004 | Nabeshima | |
| 7,000,828 B2 * | 2/2006 | Jones | 235/379 |
| 7,182,249 B2 * | 2/2007 | Johannesson et al. | 235/375 |
| 7,451,913 B2 * | 11/2008 | Blair et al. | 235/375 |
| 2007/0216747 A1 * | 9/2007 | Blair et al. | 347/132 |

* cited by examiner

*Primary Examiner* — Daniel St.Cyr
(74) *Attorney, Agent, or Firm* — Sullivan & Worcester LLP; Christopher T. McWhinney (57) ABSTRACT

A method and system for calibrating optical reader systems employs a target with areas comprising linear gray scale levels. The gray scale levels include the darkest and the lightest scenes. The gray scale levels are illuminated by an array of LEDs and the light reflected from target impacts photo-transistors. The photo-transistors are biased in their linear ranges and the target is scanned while the LED drive current is changed. The photo-transistor responses to the different gray scale levels at the different LED drive currents are analyzed, and the LED rive current that produces a linear output from the photo-transistors over the gray scale dynamic range is selected. Several video channels may be used and their offsets and gains are normalized. Black offsets and black to white gain correction functions are generated for balancing or correcting each pixel. The correction functions may be applied by a processor for later raw image data of scenes scanned by the optical reader.

23 Claims, 8 Drawing Sheets

SYSTEM AND METHOD FOR CALIBRATING AN OPTICAL READER SYSTEM

BACKGROUND OF THE INVENTION

1. Field of the Invention

The present invention relates to a system and method for setting up and calibrating an optical reader system.

2. Background Information

Optical readers are found in many types of systems, including scanners, copy machines, and document readers, such as, e.g., reader systems for processing markings in an image of a form, such as a lottery playslip. Lottery playslips include, e.g., a card, a ticket, or other printed media that indicates a player's lottery number selections. The playslips are used by a player to purchase a lottery ticket having player-indicated lottery number selections. The markings on lottery playslips are processed, e.g., to determine the numbers selected by a player for an upcoming lottery drawing.

Optical reader systems commonly include a motor that drives a document that is in contact with an illuminating bar positioned across the width of the document. As the document is driven past the illuminating bar, the bar scans the entire width and length of the document. Illumination is typically provided from light emitting diodes (LEDs) distributed along the length of the bar, but other illumination sources also may be used. Light or photo-sensitive receivers also are distributed along the length of the bar and are positioned to receive light that is reflected from the document as it passes the bar. In this environment, each photo-sensitive receiver represents a pixel and the intensity of the reflected light corresponds to the scene on the document; and, generally, more light is reflected from light areas and less from dark areas. Typically, the photo-sensitive receivers are photo-transistors, though other photo-sensitive devices may be used; and the output levels of the photo-transistors correspond to the intensity of the light that is received. The photo-sensitive transistors are electronically scanned across the width of the document. Herein, "scanned," "read out", "sampled", and "clocked out" may be used interchangeably, and "light-sensitive" and "photo-sensitive" and combinations thereof are used interchangeably.

Calibrating an optical reader system for optimum operation is important for maintaining the integrity and the commercial competitiveness of any practical system. The photo-sensitive devices should allow for a wide linear gray scale dynamic range. That is, the device outputs an approximately linear signal that distinguishes dark levels from the lighter levels with many gray levels therebetween.

In a lottery environment, for example, an optical reader system is incorporated into an instant ticket lottery terminal and the reader's main function is to interpret the marks made by a player on a lottery playslip. An uncalibrated reader will produce a less uniform image of the playslip and, consequently, present a very good risk that a player's marks on the playslip may be missed or misinterpreted. By properly calibrating a reader, the playslip image is flattened and the marks on the slip are more clearly read and more accurately interpreted; thus, making the reader and lottery terminal more reliable.

Some calibration techniques currently know in the art include turning off the light source and shading the document so that the photo-sensitive devices receive no light. According to this technique, a "dark current" (which reflects leakage or droop that some photo-sensitive devices exhibit) is measured and a correction factor developed. In some respects, this correction is suspect in that optically scanning an item does not occur with no light.

SUMMARY OF THE INVENTION

The present invention is directed toward calibrating an optical reader system for a wide dynamic range linear response to gray levels. Calibration employs a target having a range of linear gray levels from black to white that exercises the scenes contemplated to be read by the optical reader.

Illustratively, light sources are arranged in a horizontal row on a bar that is positioned across the width of a document (e.g., a sheet of paper) that is motor driven past the bar. The light sources illuminate an area across the width of the document as the document is driven along the length of the document. Light from the light sources is reflected from a horizontal row on the document to a corresponding row of photo-transistors that are also arranged on the bar. Illustratively, there are 1728 photo-transistors evenly distributed on the bar to form 1728 pixels on the row across the width of the document. In one application, the light sources are a row array of LEDs (light emitting diodes) and the light sensors are a row array of photo-transistors, but, as mentioned above, other devices may be used.

The photo-transistor outputs, illustratively, are video signals that are input to analog to digital converters (ADCs) that digitize them producing digital numbers or DNs. The DNs represent the intensity of the reflected light hitting each photo-transistor. These DNs may be stored by a field programmable gate array or other computer system.

LEDs and photo-transistors are non-linear, but both have limited areas where their responses are reasonably linear. LED characteristics, however, may change over time and typically require routine calibration. Electronically compensating for non-linearities (usually by feedback techniques) may be complex and expensive.

Photo-transistors may be individually biased near the midpoint of their linear ranges. Photo-transistors are reasonably stable so usually no further action is necessary.

Illustratively, calibrating an optical reader entails setting the drive current of the LEDs, balancing (correcting) the offsets and gains of the video channels, and then balancing (correcting) the offsets and gains of each pixel.

According to an embodiment of the present invention, a test target (or, "target") is scanned by the reader. The test target has gray scale areas that have predetermined linear gray scale values. The LED drive current that is selected is that current that produces reflected light from each gray scale area that approximately matches the expected value for that gray scale area.

In one embodiment, the gray scale areas are vertical columns on the target. In another embodiment, the gray scale areas are continuous gradations from black to white.

In one application, the LED drive current is selected by averaging the pixel DNs in a portion of each column illuminated by a given light level. The given light level is acceptable when the difference between DNs of adjacent columns exceeds a heuristically generated number, e.g., 10, and when the difference between DNs of the darkest and the lights columns exceeds a second heuristically generated number, e.g., 200.

In another application, bins for each gray scale area are formed by the digital numbers from the ADCs for the expected reflected light from each gray scale area. Histogram are formed for each bin of the number of pixels in each bin. Illustratively, when the LED drive currents are at the high end of the expected linear range, the light reflected from each of the gray scale areas will exceed expectations. The histogram of pixels in the darkest ranges may contain a small number and the histogram of pixels in the highest ranges may contain a very large number.

When the LED drive currents are at the low end of the expected linear range, the light reflected from each of the gray scale areas will be less than expectations. The number of pixels in the darkest ranges may be very large and the number of pixels in the highest ranges may be very small.

When the LED drive current is somewhere in the middle of the expected linear range, the number of pixels in the bins from the darkest to the lightest will all have about the same number of pixels. That LED drive current is selected and used to illuminate subsequent documents.

Alternatively, targets with marginal scenes that exercise a required response may be used to find an acceptable LED drive current. Other tests, as may be known to those skilled in the art, may be used to advantage.

That selected LED drive current is then used to illuminate black and white areas of the target and relative offsets and gains for each of the video channels may be determined and stored as correction values for each video channel.

Once the light level and the video channels have been calibrated, the black and white responses for each pixel are analyzed and relative offsets and gains for each pixel are determined and stored as correction values for each pixel.

In one embodiment, the optical reader, as calibrated above, may read a mid-range gray scale area. The resulting number of pixels that return the expected value for that gray scale area may be used as a quality measurement of the reader. The more pixels the better, and the standard deviation may be determined where the smaller standard deviation may also serve as a quality number. In one application, these quality numbers may be read from a distant locale via the Internet.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
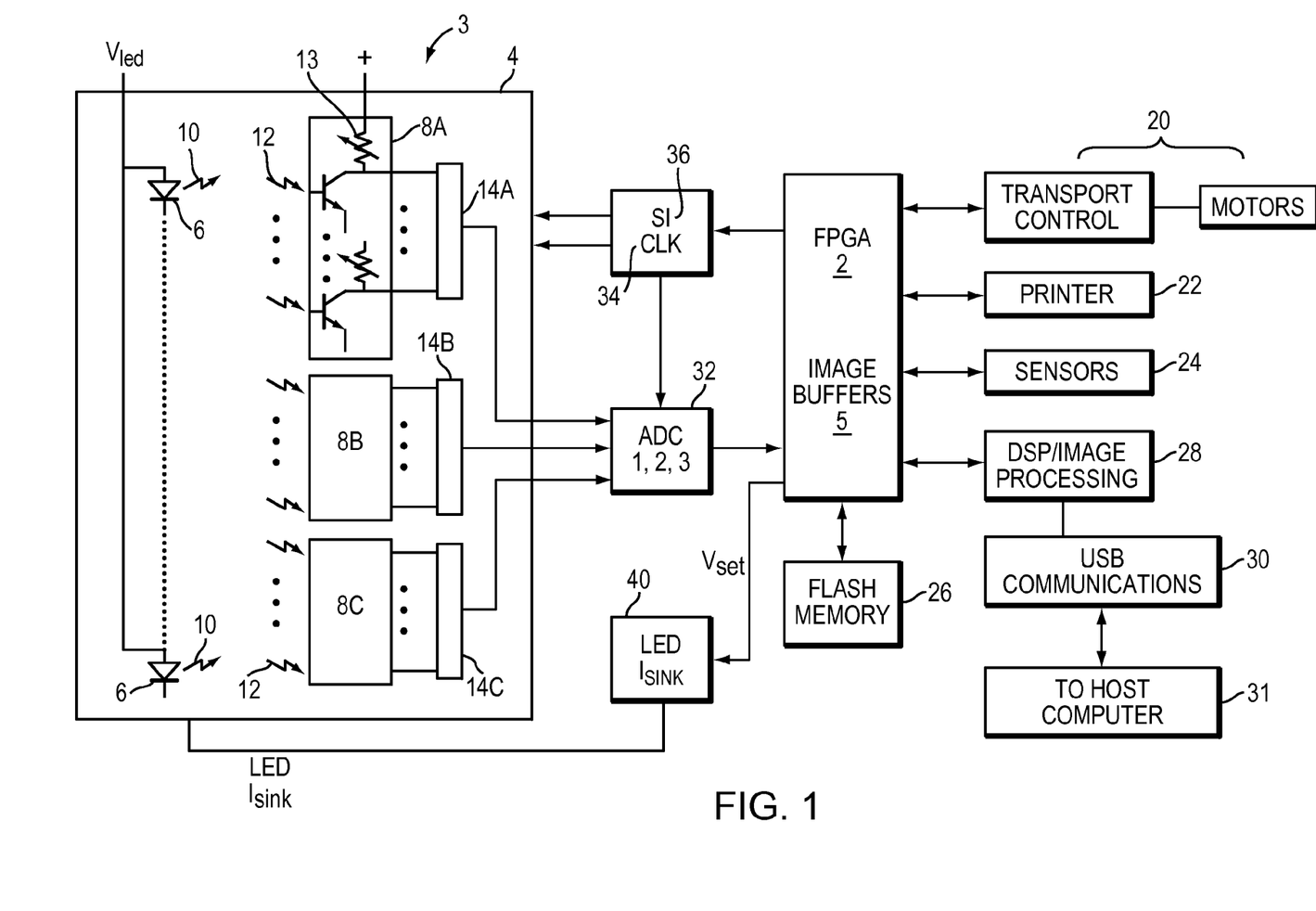
FIG. 1 is a system block diagram that may embody the present invention.

FIG. 1 is a block diagram schematic representation of an optical reader system incorporating the present invention.

FIG. 1 illustrates an optical reader 3 of LEDs (light emitting diodes) 6 and three banks of photo-transistors 8A, 8B, and 8C. Additional optics, electronics and hardware that are employed in conjunction with the present invention, and known to those skilled in the art, are not shown in FIG. 1, and are only inferentially discussed herein.

A FPGA 2 (field programmable gate array) controls the reader 3. The reader 3 includes a bar (not shown) mounting a row of LEDs 6 that extends horizontally across a document (not shown) to be read. The bar also mounts a row of photo-transistors arranged in three groups, 8A, 8B and 8C, respectively. Illustratively, each group of photo-transistors 8A, 8B, 8C contains 576 photo-transistors or, collectively (in this application) 1728 photo-transistors, where each photo-transistor constitutes one pixel (picture element). If a sheet of paper (not shown), is fed into the reader, light 10 from the LEDs 6 strikes a horizontal row across the width of the paper. Light reflected 12 from the paper strikes the photo-transistors, 8A, 8B, 8C. The output from the photo-transistor groups 8A, 8B, 8C is coupled via multiplexing circuits 14A, 14B, 14C to a three channel analog to digital converter (ADC) 32. That is, the output a first photo-transistor in each block is clocked output simultaneously through multiplexing circuits 14A, 14B, 14C. Then, the next clock outputs the output of the next photo-transistor. This is repeated until each of the 576 pixel outputs from each photo-transistor in the groups of photo-transistors have been clocked out and digitized. Illustratively, each ADC channel 32 converts each photo-transistor (each pixel) output into eight (8) bits representing 256 gray levels possible for each pixel. According to this embodiment, 255 is the ultimate white and 0 the ultimate black. The digitized outputs are collected and stored by the FPGA 2 in image buffers.

In FIG. 1, control signals from the FPGA 2 include a SI (start integration) signal 36 that enables a CLK (clock) signal 34 to clock out via the multiplexers 14A, 14B, and 14C, in parallel, the signals from each of the 576 photo-transistors in the three groups until all 1728 pixel output signals have been sent to the three channel ADC 32.

Each photo-transistor has a pull up resistor 13 that may be selected to bias each photo-transistor in its mid-linear range. Since photo-transistors remain largely stable over time, as mentioned above, the selection of these resistors usually occurs once.

LEDs 6 change as they age, however, so that re-calibration is desirable to maintain proper operation of the optical reader 3. Calibrating an optical reader includes, as described below, fast automatic calibration of the LEDs 6 by selecting the drive current, LED $I_{SINK}$, that preserves a wide linear dynamic range.

Figure 2:
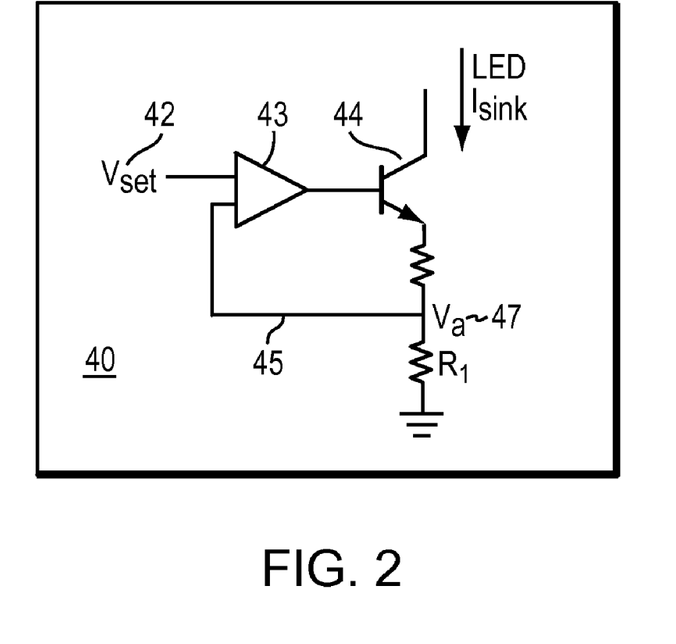
FIG. 2 is a schematic of a control for the LED drive current.

The FPGA 2 controls LED drive current via a circuit illustrated in the module 40 that is shown in more detail in FIG. 2. The FPGA 2 generates a voltage, $V_{set}$ 42, that drives an operational amplifier 43 that, in turn, drives the base of a transistor 44. The collector of transistor 44 is connected to sink all the current from all the LEDs 6 in the row. If $V_{set}$ 42 is raised or lowered, $V_a$ 47 is correspondingly raised and lowered, via the feedback 45. The current through $R_1$ is raised or lowered and, so, the current through the transistor 44 is raised or lowered, respectively. Accordingly, LED $I_{sink}$ is controlled by the FPGA 2.

Since the characteristics of the LEDs 6 are known from the supplier, a range of LED currents may be determined that will encompass the linear characteristics of the LEDs even as they age. In one application, the range of LED $I_{sink}$ runs from 378 mA to 18 mA. In this application, the LED currents are 378, 306, 198, 162, 126, 90, 54 and 18 mA. This range will encompass the linear range of the LEDs even after aging.

Returning for a moment to FIG. 1, the FPGA 2 will typically include image buffers 5 and an image processing application program 28 that is connected to a USB (universal serial bus) communication port 30 to a host DSP (digital signal processor) or micro or personal of other such computer 31. The host computer 31 will perform image analyses.

The FPGA 2, via a transport control and motors 20, moves a document by the illuminating and photo-sensing bar. The FPGA 2 also typically includes drivers for a printer 22, various sensors 24, e.g., door open sensors, and a port that connects to a flash memory module 26 to upload the operating software into the FPGA 2. In this application, when the flash memory 26 is removed, the memory in the FPGA 2 will retain none of the applications programs.

Once the reader is calibrated, in one application it processes lottery play slips, wherein the type of play slip, the printed markings and the selections by the player are read, sent to a host computer where the play slip may be accepted, or validated if a winner with the payout authorized.

Calibrating the Light Source

Figure 3:
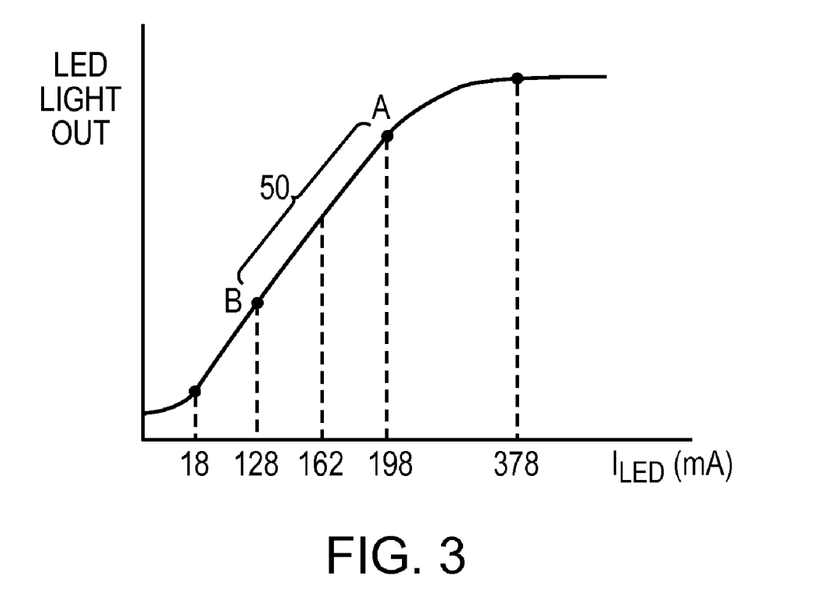
FIG. 3 is a chart of LED responses.

FIG. 3 graphically illustrates a linear range of LED outputs against LED currents that match the above sequence of LED currents. Here, point A is at 198 mA, point B is at 128 mA, and the graph trace 50 is near linear between A and B.

Figure 4A:
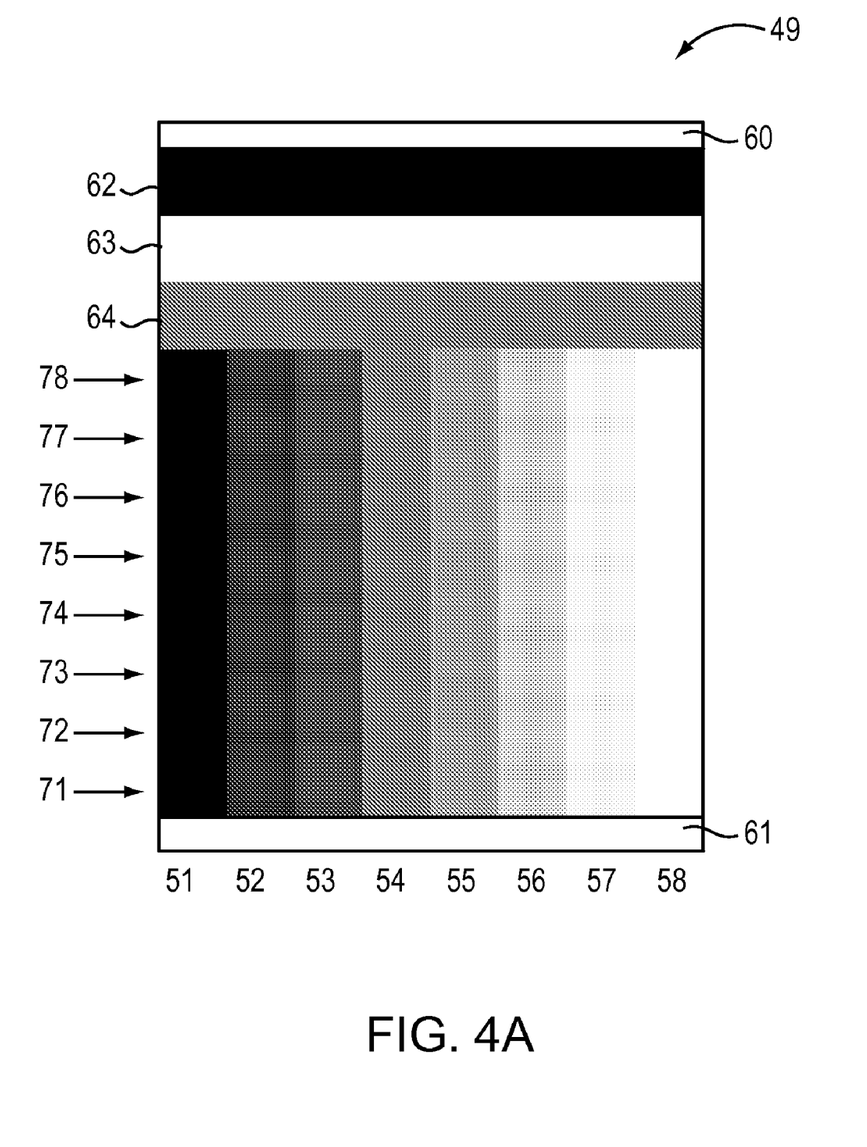
FIG. 4A is a target that may be used with the present invention.

FIG. 4A illustrates a target 49 having an exemplary pattern that, in this instance, has eight vertical columns 51-58, black at the left and white at the right with shades of gray between. Each column is about (height×width) 197 mm×27.2 mm. There are 1728 pixels across the width or 216 across each column, and each column is 1567 lines high. In this embodiment, each vertical line is about the same height as a pixel is wide.

There are two narrow horizontal white stripes 60, 61 of about (height x width) 8.8 mm×218 mm that provide a distinctive buffer to easily identify the target edges. The buffers are 1728 pixels wide and 70 lines high.

There are three horizontal bars across the top of the target, one black 62, one white 63, and one gray 64, each is about (height×width) 27.3 mm×218 mm. Each bar is 1728 pixels wide and 216 lines high.

The entire target is, in this embodiment, is about 297 mm height and 218 mm wide, a little wider than the size of an A4 sheet of paper. Other sizes, however, may be used.

When the target is illuminated by an optimum LED light, the reflected light is received by photo-transistors that output a video signal to the ADCs. The ADCs produce an eight bit DN (0-255).

Selecting an Operating LED Drive Current

Figure 4B:
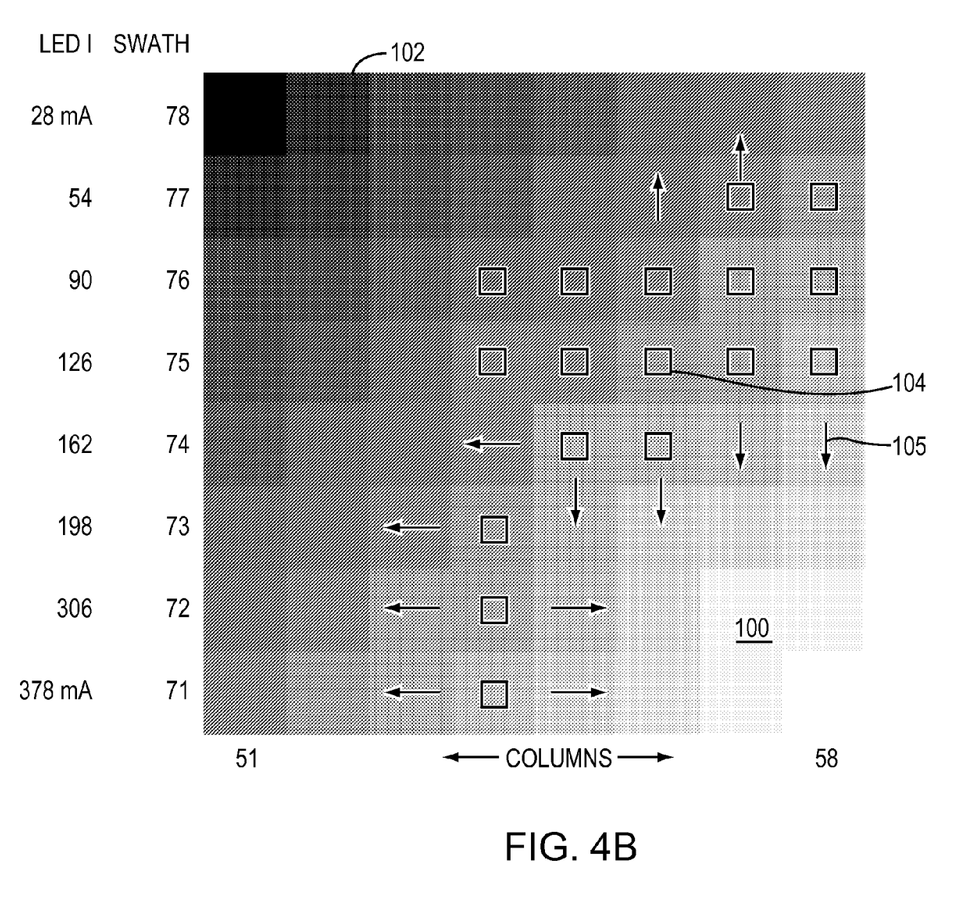
FIG. 4B is the target of FIG. 4A with different illuminating light levels.

FIG. 4B illustrates the target of FIG. 4A with different illuminating light levels, having eight left to right rows or swaths (71-78) across the eight columns (51-58) defining a two dimensional array of sixty-four squares. Using this target embodiment, one illustrative approach to selecting the optimum LED current is to first select an area 104 of 124×91 (124 pixels wide by 91 vertical lines) at the center of each of the sixty-four squares. With the bar at swath 71, at the highest LED current of 378 mA, the DNs (digital numbers) from the ADCs for each selected area in swath 71 for each column 51-58 are captured, and an average DN for each of the selected areas is calculated. The LED current is reduced and the process repeated for each succeeding swath until all sixty-four areas have an average DN. The entire array of eight by eight or sixty-four squares are stored.

FIG. 4B illustrates the eight columns and eight swaths where the resulting shades of gray indicate the light from each column for each swath as the LED drive current is at its highest 378 mA to its lowest 28 mA. As can be seen at the portion 100, many of the squares, defined by the intersection of a column and a swath (about 216 pixels by 216 lines) at an LED current of 378 mA, are in the whitest bin, DNs of 249-255. And at the portion 102, where the LED current is 28 mA, many squares are in the blackest bin, DNs of 20-24. Note that, at swath 75 and LED current of 126 mA. each of the shades of gray across the width illustrate a difference with the blackest at the left and the whitest at the right. This artifact may be used for one approach to selecting the optimum LED drive current and, therefore, light output.

For example, an area illustrated by item 104 is an area of 124 pixels by 91 lines near the center of the square defined on swath 75, at column 56. This size square is formed for each of the sixty-four squares and the average DN for the pixels within each square is calculated. Then, for each swath, the difference in average DN between each succeeding column is calculated, e.g., columns 51 and 52 is calculated, then columns 52 and 53, until the last difference is columns 57 and 58. For each swath, a standard may be applied that requires the minimum difference (MD) between each column to be least a DN of 10, and the difference in average DN between column 51 and 58 is at least a DN of 200. A swath that meets that requirement may represents an optimum or at least acceptable LED current. From FIG. 4B, it is evident that swath 75 meets the requirement.

The numerical DN differences used here are derived heuristically and other criteria may be used in other applications. A complementary approach is that an at least acceptable operating LED current (and therefore the LED light output) exists when an equal number of pixels will be found in each of the eight bins, defined by the digital numbers above, across a swath.

Figure 5:
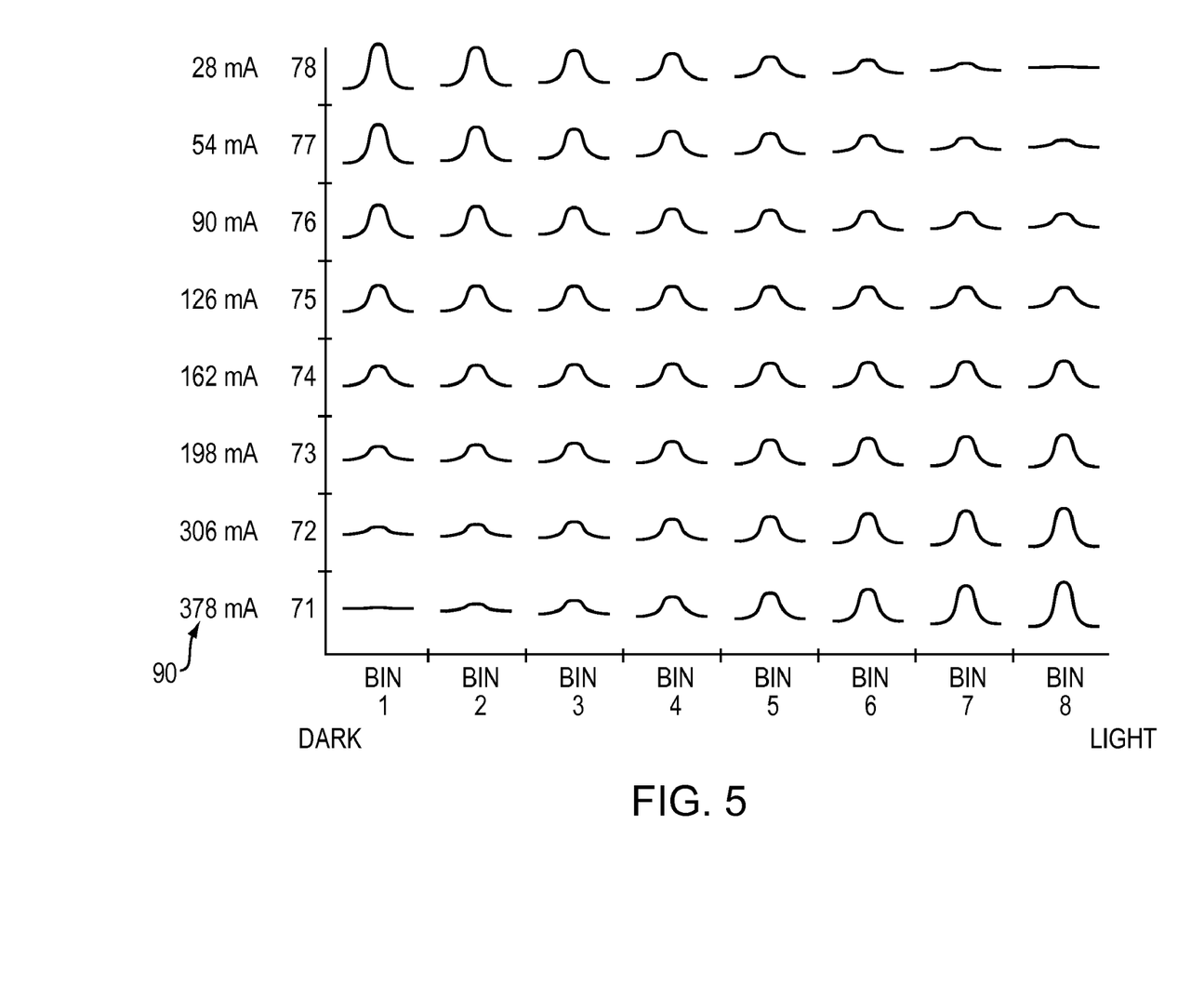
FIG. 5 illustrates traces of possible histograms.

FIG. 5 is a graph with a vertical axis that is the same as on FIG. 4B, however, the horizontal axis are bins that accumulate pixels from the target that fall into predetermined DN ranges. At an optimum LED light level, each gray level column in the target is designed to fall into the following defined bins defined by the following digital numbers, DN (the eight bit ADC outputs):

| Bin 1 | For black bar 62 and black column 54 | DN 20-24 |
|---|---|---|
| Bin 2 | Gray column 55 | DN 45-49 |
| Bin 3 | Gray column 56 | DN 114-120 |
| Bin 4 | Gray column 57 | DN 147-153 |
| Bin 5 | Gray bar 64 and gray column 58 | DN 153-159 |
| Bin 6 | Gray column 59 | DN 197-203 |
| Bin 7 | Gray column 60 | DN 236-242 |
| Bin 8 | White bar 63 and white column 61 | DN 259-255 |

In the complementary approach, swath 71 shows the numbers of pixels falling into each bin arranged horizontally across the graph for illustrative purposes. Notice that the bins only record those pixels with the indicated digital numbers regardless of the physical source of the pixels across the target. The positioning illustrates theoretically those pixels that most likely will fall into the various bins. For example, at an acceptable light level the pixels from the column 51 will fall into bin 1 (the darkest) and the pixels from column 52 will fall into bin 2, etc.

The traces in FIG. 5 illustrate a series of histograms are shown for each swath 71-78 as the LED drive currents 90 on the far left are changed. For swath 71, at an LED drive current of 378 mA, the high light level reflects more light from the darker columns 55-58 that fall into bins 5, 6, 7 and 8 making their contents higher than might be expected at an acceptable light level. So, the darker bins 1-4 contain few pixels, while bins 5-8 have more pixels. On swath 72, at an LED drive current of 306 mA, some pixels fall into bins 3 and 4, but there are still more pixels in the lighter bins 5-8.

Shifting to where the LED drive current is very low at 28 mA, swath 75 is like an opposite of swath 71, there are many more pixels in the darker bins and little or none in the lighter bins.

Swaths 75 and 74, where the LED drive currents are 126 mA and 162 mA, respectively, both show an exemplary histogram where each bin has about the same number of pixels. Here, either 126 mA or 162 mA may be acceptable LED drive currents for the succeeding calibration steps.

One criterion for selecting the LED drive current may be that drive current where the total of the pixels in all the bins is a maximum compared to any other drive current. Another criterion, however, for an acceptable drive current may be when each of histograms for all the bins are nearly equal to each other. These two criteria, along with the DN difference approach described above, may be used singly or together as trial and error may suggest.

Figure 6:
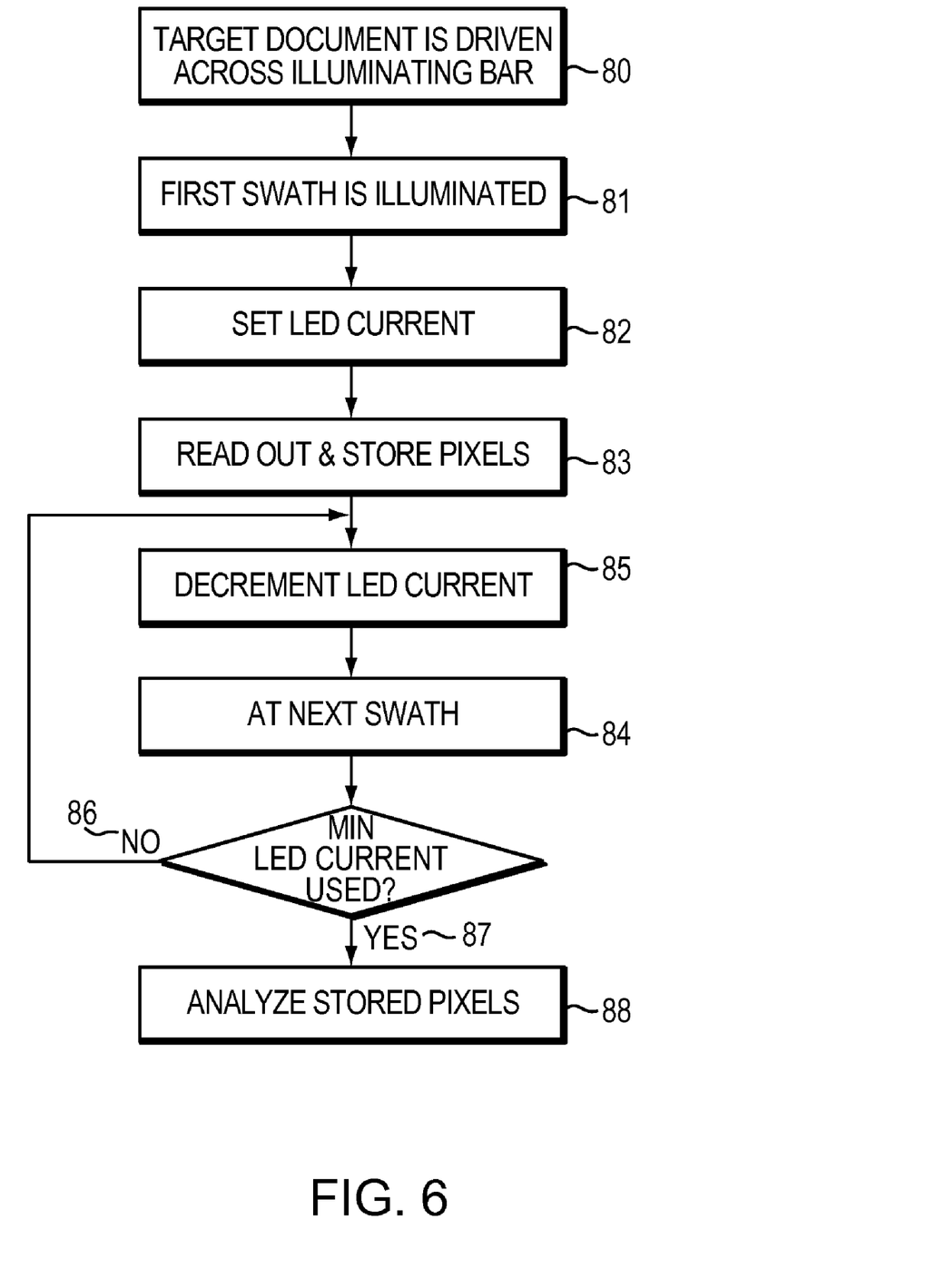
FIG. 6 is a flow chart of a calibration run.

FIG. 6 illustrates the steps in an exemplary calibration process according to the present invention. According to this process, in step 80, a target 49 is driven across the illuminating bar 80. In step 81, the first swath 71 is positioned adjacent to the illuminating bar and is illuminated. In step 82, the LED drive current is set to the maximum of 378 mA. In step 83, the pixels in first swath 71 are read out across the eight columns 51-58 and the pixel read out data is stored. As described more particularly above, in step 83, an area (126×91) near the center of each square defined by the column and the swath are readout. The speed of the transport and the settling time of electronics are factors that determine the actual speed of the target.

In steps 84 and 85, the target 49 is moved until the target swath 72 is illuminated, and the drive current to the LEDs is reduced to 306 mA. The DNs for the pixels across the width of the target 49 are collected and stored for each reduced drive current for each corresponding swath as was done for swath 71. If the minimum LED current is not used, in step 86, the process continues until all eight swaths across all eight columns have been processed, as shown in step 87. According to the above-described embodiment, the successively reduced LED drive currents are: swath 71—378 mA; swath 72—306 mA; swath 73—198 mA; swath 74—162 mA, swath 75—126 mA; swath 76—90 mA; swath 77—54 mA; and swath 78—28 mA. Once the minimum LED current has been used, the stored digital image is analyzed, as shown in step 88.

The analyses may be those illustrated above, but other analyses related to those discussed above may be used to advantage.

As discussed above, the transport drives the target, and the digital number for each of the pixels across the width and vertically on each lines of the target are read out and stored. The actual pixels that are used in the subsequent calculations may omit pixels away at edges of the areas involved.

Balancing the Three Video Channels

Figure 7:
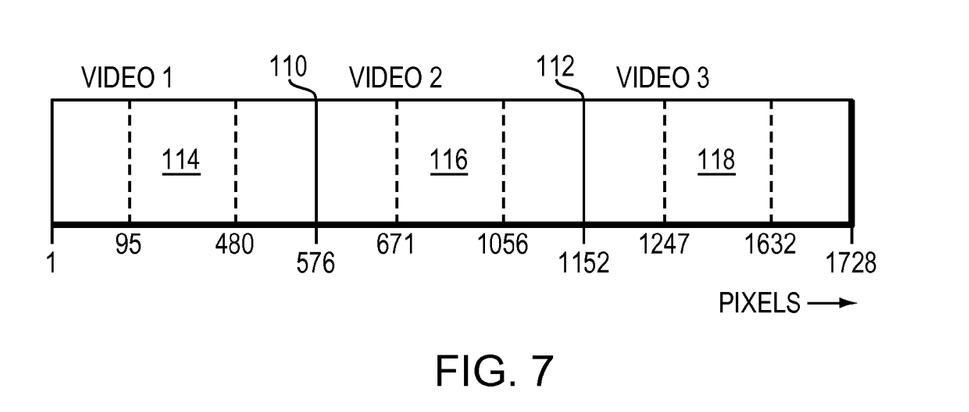
FIG. 7 is an illustration of pixels distributed among three analog to digital converters (ADCs)

FIG. 7 illustrates balancing or correcting the three video channels to minimize "stitching." "Stitching" refers to transitioning over the boundaries from one video channel to the next. The transition should be seamless showing no shading difference as the boundaries are transcended. With the same scene the pixels read out on either side of the boundary should read the same result. FIG. 7 illustrates one example of three heads showing the boundary 110 between video 1 and video 2, and the boundary 112 between video 2 and video 3.

Note that the three video channels are balanced via hardware means before they are installed in a reader. The following illustrates software balancing to "fine tune" the three video channels.

FIG. 7 shows pixels 1 to 576 feeding though video channel 1, pixels 577 to 1152 feeding through video channel 2, and pixels 1153 to 1728 feeding through video channel 3. Only the 385 pixels near the center 114, 116, and 118 of each video channel are averaged over the lines, as described in greater detail below.

Figure 8:
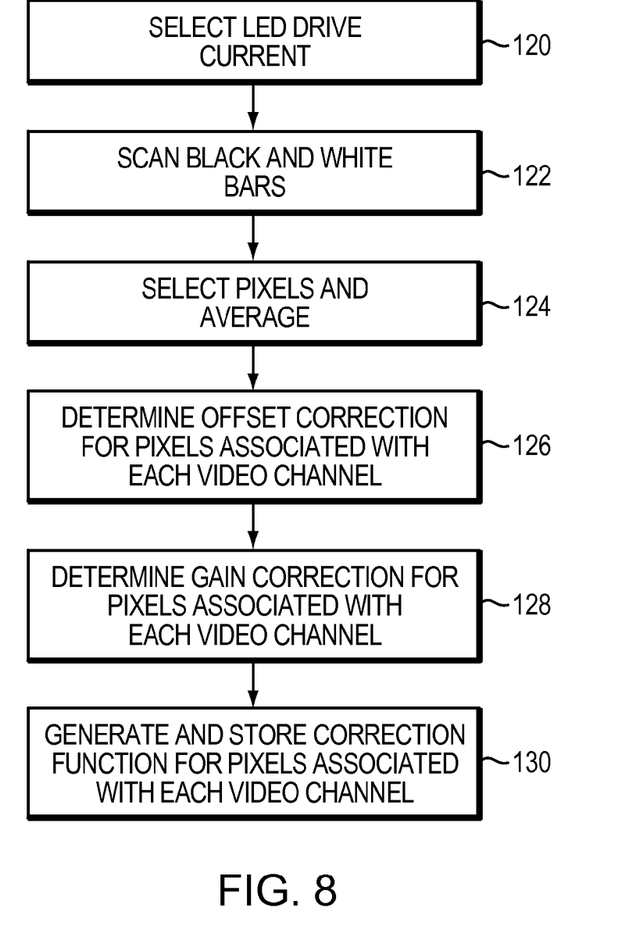
FIG. 8 is a flow chart of balancing or correcting for offset and gain of the three video channels.

Referring to FIGS. 7 and 8 together, and as discussed above, there are three video channels that each produce a string of digital numbers via the ADCs. Each channel scans one third, or 576 of the 1728 pixels across the width of the target. These channel outputs must be balanced to provide a coherent image without any stitching artifacts at the boundaries.

FIG. 8 provides a flow diagram describing the balancing or correcting of the offset and gain of the three video channels. In steps 120 and 122, the LED current is selected as shown above, and the FPGA (FIG. 2), commands the reader to scan the black 62 (FIG. 4A) and white 63 (FIG. 4A) bar regions at the top of the target. Illustratively, a number of horizontal lines in the center of each bar are scanned across the entire width of the bar regions and the ADCs output DNs that are averaged 124 over the lines and stored for each pixel. In step 124, the offset for each pixel associated with each video channel is determined.

In step 128, the gain for the three video channels is corrected or adjusted by analyzing the average values for the same selected pixels when receiving reflected light from the white bar. And, in step 130, the video pixel group offset and gain corrections are used to form a correction function for each pixel associated with each video channel and stored.

Illustratively, the corrections using the averages of the selected pixels, after the balancing of the video channels, might yield averages of, e.g., DN=25 for black and, e.g., DN=255 for white.

In one embodiment, the ADC channel offsets are held in a sign plus an eight bit byte with a voltage range of about −300 mV to +300 mV in 512 steps.

Still referring to FIGS. 7 and 8, if the averages are unequal by more than an allowable margin the calibration may be considered as failed. One standard might be a DN of 10, but other standards may be used. That is, if the averages are unequal by a DN of 10 or more the reader may be rejected.

Balancing the Pixels

Figure 9:
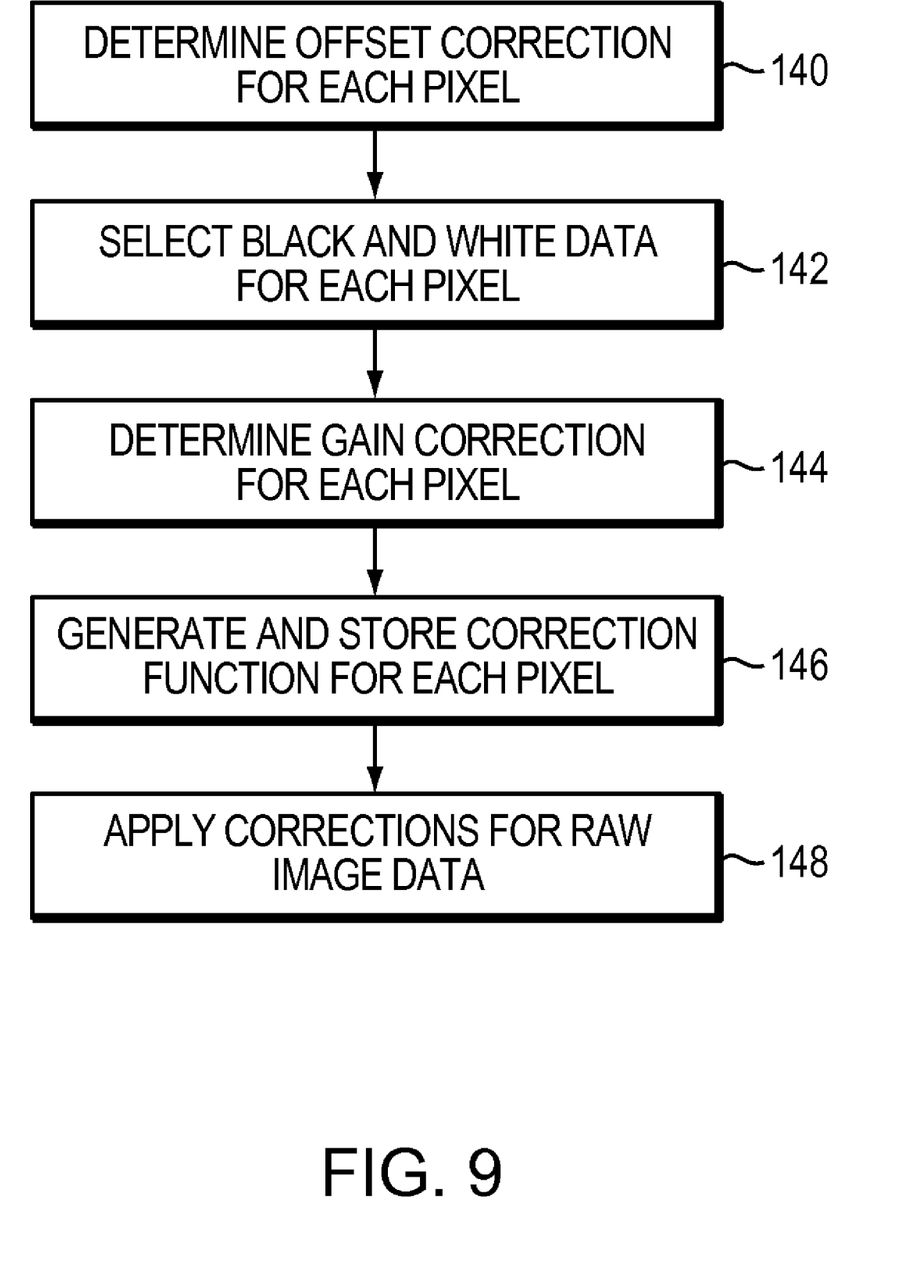
FIG. 9 is a flow chart of balancing or correcting for offset and gain for each pixel.

Referencing FIG. 9, once the LED current and the offsets and gains for the ADC channels have been established, an offset and gain correction or adjustment may be made for each pixel itself. The black and white averages for each pixel 140 over the selected lines were generated for balancing the video channels. Those same stored values may be selected to balance (correct offset and gain) each individual pixel. The operation is similar to that used for the channels, except here the values for each pixel is used, whereas balancing the video channels used the values for the central group of pixels. Using the black data an offset correction is determined for each pixel 142, and, using the white data, a gain correction is determined for each pixel 144. A correction function is generated that combines the offset and gain corrections for each pixel and stored 146. The correction function is then applied 148 to raw image data.

For example, if the average over a number of lines for every pixel across the black bar is 25, a DN of 25 is generated for each pixel black level by adding or subtracting a correcting value. Then, the gain of each pixel is established by analyzing the average over a number of lines of the white level DNs for each pixel across the white bar. The difference from the black to the white level for each pixel is used to calculate a gain corrected for each pixel.

Generating the Correction Functions

The correction functions for both the video channels and the individual pixels are generated in a similar fashion, as follows.

A linear function is assumed where a linear offset and gain correction may be employed. The function that applies is $y(n)=g(n)+B$, where y is a digital number reading for the particular pixel, n represents each pixel, g is the gain and B is the offset.

The following correction technique is exemplary and may be modified.

Consider that an eight bit binary digital number the exemplary DN for the whitest level was 252 (out of 255) and the DN for the black level was 25. Here the gain is 252−25=227.

The correction function for a particular pixel would be the following:

$$yc=(yu-blk)(227/yu-blk)+25 \quad \text{EQ. 1}$$

where, for the pixel, blk is the DN measured for black level bar 62; yc is the corrected pixel DN, yu is the measured DN and 25 is the exemplary black level DN.

Checking EQ. 1 at the end points, if the measured yu is 254 and the blk was 20, EQ. 1 would yield: yc=(234)(227/234)+25=252−the exemplary white DN. And, if yu was 20, yc=25−the exemplary black DN.

Quality Check for Readers

As illustrated FIG. 4, item 64 is a gray scale bar across the width of the document. All 1728 pixels or a subset thereof may be scanned and the DN number stored. The subset may be, for example, the 126 lines across the center of the gray scale bar. This scanning may be performed on a reader that has been fully calibrated as discussed above, or it may be scanned using earlier in the calibration process, e.g., before the pixels are balanced.

The resulting mean DN and standard deviation may be and stored calculated for the pixels measured. At a predetermined time, when the reader is in the field, a target document may be scanned by the reader. A base system via the Internet may read the area of the gray scale bar and generate the mean and standard deviation. Those numbers may be compared to the initial stored mean and standard deviation. The differences may be used to judge the status of the reader. The difference values may indicate that immediate service or recalibration is necessary, or that the reader is fully operational. The values may be derived from operating many readers over extended time periods, or they may be calculated by inferring changes in readers as they age.

These embodiments are being presented herein as examples and that many variations and alternatives thereof are possible. Accordingly, the present invention should be viewed broadly as being defined only as set forth in the hereinafter appended claims.

What is claimed is:

1. A method for calibrating an optical reader system, the method comprising the steps of:
    placing a target with known gray scale areas in a location where the target may be scanned by a light source with reflected light impacting light or photo-sensitive devices;
    each light or photo-sensitive device defining a pixel;
    determining two light levels from the light source, one high and one low;
    setting the light at one of the two levels and, at that level, scanning a portion of the target traversing different gray scale areas;
    measuring the light received by each pixel, the measurement value held as a digital number;
    successively changing the light level toward the unselected of the two light levels and measuring the digital numbers;
    analyzing the digital numbers for each of the light levels, and therefrom determining which light level produced the best linearity; and
    selecting that light level.

2. The method of claim 1 further comprising the steps of:
    measuring the digital numbers received from a black scene for each pixel;
    measuring the digital numbers received from a white scene for each pixel;
    calculating the average digital numbers received for all the pixels for the black scene and an average digital numbers received for the white scene; and
    calculating an offset correction and a gain correction factor for each pixel by comparing the actual black and white digital numbers received for each light-sensitive device to the average black and white digital numbers received.

3. The method of claim 1 wherein the light source is an array of LEDs.

4. The method of claim 1 wherein the light sensitive devices are an array of photo-transistors.

5. The method of claim 1 further comprising the steps of:
    measuring and averaging the digital numbers received by a group of light-sensitive devices within each gray scale area for each of the light levels;
    establishing a gray scale threshold; and
    calculating the differences between the average of the digital numbers for adjacent gray scale areas for each light level; and, if the differences exceed the threshold, selecting that light level.

6. The method of claim 5 further comprising the steps of:
    establishing a second gray scale threshold;
    calculating the difference between the digital numbers for the darkest and the lightest gray scales, and, if the difference exceeds the second threshold, selecting the light level.

7. The method of claim 1 further comprising the steps of:
    forming a target with areas having a range of different gray scales;
    measuring and averaging the digital numbers within each gray scale area for each pixel;
    forming a histogram of the number of pixels yielding a given range of digital numbers;
    comparing the histograms for each given gray scale level; and
    selecting the light level from the range of light levels where the histograms all contain about the same number of pixels.

8. The method of claim 1 further comprising the steps of:
    illuminating, with the light level that produced the best linearity, a black area and measuring the digital number from that black area;
    averaging the digital numbers received from the black area, this average comprising an average offset;
    illuminating a white area and measuring the digital numbers of pixels from that white area;
    averaging the digital numbers received from the white area, wherein the difference between the average offset and the average of the digital numbers received from the white area comprises a gain;

calculating the difference between the average of the digital numbers received from the black area to the digital numbers received from the black area for each pixel, wherein the difference comprises an offset correction for each pixel; and calculating the difference between the average of the digital numbers received from the white area to the digital numbers received from the white area by each pixel, wherein the difference comprises a gain correction for each pixel, wherein subsequent measurements for each pixel will be corrected by the corresponding offset and gain corrections.

9. The method of claim 1 further comprising the step of:

forming a target with at least one mid-range gray scale area that is between the darkest and the lightest gray scales on the target;

measuring the digital numbers from the mid-range gray scale area using the selected light level; and generating a quality factor from the measured digital numbers from the mid-range gray scale area, wherein the factor indicates the status of the reader system.

10. The method of claim 1, wherein after the light level is selected, the method further comprises the following steps:

placing a lottery play slip in the optical reader;

reading the lottery play slip, and sending the information read from the play slip to a host computer for processing.

11. The method of claim 1, further comprising the steps of:

setting the light level at at least one additional light level and, at each additional level, scanning a portion of the target traversing different gray scale areas; and measuring the light received by each pixel, the measurement value held as a digital number.

12. The method of claim 1, wherein the target has a linear range of known grey scale areas.

13. A system for calibrating an optical reading system, the system comprising:

a light source defining a range of light levels;

at least one light-sensitive device that defines a pixel;

a target with known gray scale areas, wherein the target may be illuminated by the light source, and wherein reflected light impacts the pixel that outputs a signal;

said system configured to illuminate different gray scale areas on the target at at least two different light levels;

an analog to digital converter that receives the signal and outputs a digital number that corresponds to the light received; wherein the digital number changes responsive to the light level changing; and a processor that analyzes the digital numbers and determines which light level produced the best linearity of received light; and sets that light level for use.

14. The system of claim 13, wherein the target is arranged to present a black and a white area, the system further comprising:

the light arranged to illuminate the black area with reflected light received by each pixel that then produces a digital number via an ADC for black; and the light arranged to illuminate the white area with reflected light received by each pixel that then produces a digital number via an ADC for white;

a processor that calculates the average digital numbers for the black area and the white area; and wherein the processor calculates an offset correction and a gain correction factor for each light sensitive device by comparing the actual black and white digital numbers received for each pixel to the average black and white digital numbers received.

15. The optical reader system of claim 14 further comprising: a play slip that is introduced into and read by the calibrated optical reading system, wherein the information from the play slip is sent to the processor for processing.

16. The system of claim 13 wherein the light source comprises an array of LEDs.

17. The system of claim 13 wherein the light sensitive devices comprises an array of photo-transistors.

18. The system of claims 13 further comprising:

digital numbers received by the pixels from a given gray scale level for each of the range of light levels; and an analyzer that sets a threshold and calculates the differences between the average of the digital numbers for adjacent gray scale areas for each light level; and, if the differences exceed the threshold, selecting that light level.

19. The system of claim 13 further comprising:

the light level, that produced the best linearity, illuminating a black area;

the light level, that produced the best linearity, illuminating a white area;

wherein the light-sensitive devices receive the light reflected from the black and the white areas and produce video signals from each black and white area;

a processor arranged to measure the video signal from the black area and provide a black average digital number, wherein the average defines an offset; and to measure the s video signal from the white area and provide an second average digital number, this second average, when the offset is subtracted therefrom, defines a gain;

a comparator the measures the difference between the average digital numbers received from the black area to the digital numbers received from the black area by each individual light-sensitive device, wherein the difference comprises an offset correction for each pixel; and wherein the comparator defines the difference between the average digital numbers received from the white area to the digital numbers received from the white area by each individual light-sensitive device, wherein the difference comprises a gain correction for each pixel, and a correction function generated from the offset and gain corrections.

20. The system of claim 13 further comprising:

a histogram of the number of pixel yielding a given range of digital numbers;

a comparator for comparing the histograms for each given gray scale level; and the light level from the range of light levels where the histograms all contain about the same number of pixels.

21. The system of claim 13, wherein the target has a linear range of known grey scale areas.

22. A computer readable medium containing executable program instructions for calibrating an optical reader system, the executable program instructions comprising one or more program instructions for:

placing a target with known gray scale areas in a location where the target may be scanned by a light source with reflected light impacting light or photo-sensitive devices;

each light sensitive device defining a pixel;

determining two light levels from the light source, one high and one low;

setting first the light at one of the two levels and, at that level, scanning a portion of the target traversing at least two areas of different gray scales;

measuring the light received by each pixel, the measurement value held as a digital number;

successively changing the light level toward the unselected of the two light levels and measuring the digital numbers;

analyzing the digital numbers for each of the successively changed light levels, and therefrom determining which light level produced the best linearity; and setting that light level for use with other scenes.

23. The computer readable medium of claim 22, wherein the target has a linear range of known grey scale areas.

* * * * *